(12) United States Patent
Yurochko et al.

(10) Patent No.: US 7,741,570 B2
(45) Date of Patent: Jun. 22, 2010

(54) SMALL FORM-FACTOR KEYBOARD USING KEYS WITH OFFSET PEAKS AND PITCH VARIATIONS

(75) Inventors: Michael Yurochko, Los Gatos, CA (US); Keith Soo Suan Ho, Singapore (SG)

(73) Assignee: PALM, Inc., Sunnyvale, CA (US)

( * ) Notice: Subject to any disclaimer, the term of this patent is extended or adjusted under 35 U.S.C. 154(b) by 0 days.

(21) Appl. No.: 12/128,455

(22) Filed: May 28, 2008

(65) Prior Publication Data

US 2008/0283378 A1 Nov. 20, 2008

Related U.S. Application Data

(63) Continuation of application No. 11/144,098, filed on Jun. 2, 2005, now Pat. No. 7,394,030.

(51) Int. Cl.
H01H 13/70 (2006.01)
(52) U.S. Cl. .................. 200/5 A; 200/512; 400/489
(58) Field of Classification Search ............. 200/5 A, 200/5 R, 17 R, 18, 512–517, 341–345; 400/472, 400/473, 476, 488, 489, 492
See application file for complete search history.

(56) References Cited

U.S. PATENT DOCUMENTS

| 1,718,694 | A | 6/1929 | Kuroski |
|---|---|---|---|
| 3,396,827 | A | 8/1968 | Harwell |
| 3,825,101 | A | 7/1974 | Wineman |
| 4,022,993 | A | 5/1977 | Shattuck |
| 4,060,703 | A | 11/1977 | Everett |
| 4,135,074 | A | 1/1979 | Malacheski |
| 4,180,336 | A | 12/1979 | Lonsdale |
| 4,196,666 | A | 4/1980 | Kobayashi et al. |
| 4,237,351 | A | 12/1980 | Boulanger et al. |
| 4,320,268 | A | 3/1982 | Brown |
| 4,394,555 | A | 7/1983 | Long et al. |
| 4,401,864 | A | 8/1983 | Ichikawa |
| 4,703,139 | A | 10/1987 | Dunlap |
| 4,735,520 | A | 4/1988 | Suzuki et al. |
| 4,839,474 | A | 6/1989 | Hayes-Pankhurst et al. |
| 4,972,051 | A | 11/1990 | Hodson |
| 4,994,992 | A | 2/1991 | Lapeyre |
| 5,107,739 | A | 4/1992 | Muramatsu et al. |
| 5,138,119 | A | 8/1992 | Demeo |
| 5,212,473 | A | 5/1993 | Louis |
| 5,266,949 | A | 11/1993 | Rossi |
| 5,274,217 | A | 12/1993 | Kilian |
| 5,401,927 | A | 3/1995 | Lundell et al. |

(Continued)

FOREIGN PATENT DOCUMENTS

DE 3235752 3/1984

(Continued)

*Primary Examiner*—Renee Iuebke
*Assistant Examiner*—Marina Fishman
(74) *Attorney, Agent, or Firm*—Mahamedi Paradice Kreisman LLP

(57) ABSTRACT

A small form-factor keyboard or keypad for key structures is provided in which individual key structures have a contact surface on which there is a center reference and a peak. The center reference and the peak or offset, so that an offset distance between the center reference and the peak is greater than or equal to zero. The offset distance for at least two or more key structures in the plurality of key structures may different. The difference in the offset distance may be based on a position of the individual key structures relative to a first reference line.

12 Claims, 4 Drawing Sheets

U.S. PATENT DOCUMENTS

| | | | |
|---|---|---|---|
| 5,471,023 A | 11/1995 | Kaizu et al. |
| 5,510,584 A | 4/1996 | Norris |
| 5,515,045 A | 5/1996 | Tak et al. |
| 5,515,763 A | 5/1996 | Vandervoort |
| 5,583,497 A | 12/1996 | Hankes |
| 5,598,469 A | 1/1997 | Preker |
| 5,660,488 A | 8/1997 | Miller |
| 5,757,292 A | 5/1998 | Amro et al. |
| 5,767,464 A | 6/1998 | Dyer et al. |
| 5,774,384 A | 6/1998 | Okaya et al. |
| 5,797,482 A | 8/1998 | La Pointe et al. |
| 5,805,157 A | 9/1998 | Bertram et al. |
| 5,805,402 A | 9/1998 | Maue et al. |
| 5,831,819 A | 11/1998 | Chacon et al. |
| 5,832,764 A | 11/1998 | Girard |
| 5,847,336 A | 12/1998 | Thornton |
| 5,926,119 A | 7/1999 | Lindeman et al. |
| 5,936,614 A | 8/1999 | An et al. |
| 5,954,437 A | 9/1999 | Wen-Hung |
| 5,973,621 A | 10/1999 | Levy |
| 5,975,711 A | 11/1999 | Parker et al. |
| 6,088,022 A | 7/2000 | Rakoski |
| 6,109,528 A | 8/2000 | Kunert et al. |
| 6,172,620 B1 | 1/2001 | Brick et al. |
| 6,217,183 B1 | 4/2001 | Shipman |
| 6,246,169 B1 | 6/2001 | Pruvot |
| D453,334 S | 2/2002 | Hobday |
| 6,346,973 B1 | 2/2002 | Shibamoto et al. |
| 6,351,255 B1 | 2/2002 | Moreno |
| 6,355,891 B1 | 3/2002 | Ikunami |
| 6,377,685 B1 | 4/2002 | Krishnan |
| 6,423,918 B1 | 7/2002 | King et al. |
| 6,426,197 B1 | 7/2002 | Change |
| 6,452,588 B2 | 9/2002 | Griffin et al. |
| 6,489,950 B1 | 12/2002 | Griffin et al. |
| 6,533,963 B1 | 3/2003 | Schleifstein et al. |
| 6,554,442 B2 | 4/2003 | Chou |
| 6,609,805 B1 | 8/2003 | Nelson |
| 6,679,613 B2 | 1/2004 | Mabuchi |
| 6,717,083 B2 | 4/2004 | Chen et al. |
| 6,741,215 B2 | 5/2004 | Grant et al. |
| 6,743,993 B1 | 6/2004 | Clark et al. |
| 6,747,402 B2 | 6/2004 | Hato et al. |
| 6,748,116 B1 | 6/2004 | Yue |
| 6,766,023 B2 | 7/2004 | Kiernan |
| 6,776,497 B1 | 8/2004 | Huppi et al. |
| 6,788,285 B2 | 9/2004 | Paolucci et al. |
| 6,802,662 B1 | 10/2004 | Cheng et al. |
| 6,854,870 B2 | 2/2005 | Huizenga |
| 6,882,337 B2 | 4/2005 | Shetter |
| 6,924,789 B2 | 8/2005 | Bick |
| 6,931,125 B2 | 8/2005 | Smallwood |
| 6,940,490 B1 | 9/2005 | Kim et al. |
| 6,981,791 B2 | 1/2006 | Higashiyama |
| 6,987,466 B1 | 1/2006 | Welch et al. |
| 7,027,036 B2 | 4/2006 | Yang |
| 7,129,433 B2 | 10/2006 | Tokusashi |
| 7,158,120 B2 | 1/2007 | Griffin et al. |
| 7,158,147 B2 | 1/2007 | Watson et al. |
| 7,182,533 B1 * | 2/2007 | Caplan ................... 400/489 |
| 7,182,907 B2 | 2/2007 | Shimizu et al. |
| 7,196,693 B2 | 3/2007 | Chien et al. |
| 7,227,536 B2 | 6/2007 | Griffin et al. |
| 7,250,937 B2 | 7/2007 | Takagi |
| 7,259,339 B1 | 8/2007 | Babella |
| 7,265,745 B1 | 9/2007 | Kling |
| 7,275,836 B2 | 10/2007 | Yurochko |
| 7,294,802 B2 | 11/2007 | Yurochko |
| 7,324,091 B2 | 1/2008 | Fyke |
| 7,391,861 B2 | 6/2008 | Levy |
| 7,394,030 B2 * | 7/2008 | Yurochko et al. ........... 200/5 A |
| 7,394,456 B2 | 7/2008 | Kim et al. |
| 7,502,462 B2 | 3/2009 | Rak et al. |
| 7,511,700 B2 | 3/2009 | Skillman |
| 7,525,053 B2 | 4/2009 | Babella |
| 7,525,534 B2 | 4/2009 | Skillman et al. |
| 7,623,118 B2 | 11/2009 | Skillman et al. |
| 2002/0030987 A1 | 3/2002 | Saito et al. |
| 2002/0044136 A1 | 4/2002 | Griffin et al. |
| 2002/0079211 A1 | 6/2002 | Katayama et al. |
| 2002/0110238 A1 * | 8/2002 | Kiernan ................. 379/433.07 |
| 2003/0054854 A1 | 3/2003 | Kela et al. |
| 2003/0063087 A1 | 4/2003 | Doyle et al. |
| 2003/0156381 A1 | 8/2003 | Lieu et al. |
| 2004/0145573 A1 | 7/2004 | Han et al. |
| 2004/0165924 A1 | 8/2004 | Griffin |
| 2005/0105256 A1 | 5/2005 | Chuang |
| 2005/0140653 A1 | 6/2005 | Pletikosa et al. |
| 2005/0174334 A1 | 8/2005 | Hannay |
| 2005/0216278 A1 | 9/2005 | Eisen |
| 2005/0259069 A1 | 11/2005 | Baker et al. |
| 2006/0033704 A1 | 2/2006 | Ladouceur et al. |
| 2006/0118400 A1 | 6/2006 | Chyc et al. |
| 2006/0146027 A1 | 7/2006 | Tracy et al. |
| 2006/0172785 A1 | 8/2006 | Phillips et al. |
| 2006/0202966 A1 | 9/2006 | Skillman |
| 2006/0202967 A1 | 9/2006 | Skillman et al. |
| 2006/0202968 A1 | 9/2006 | Skillman et al. |
| 2006/0204303 A1 | 9/2006 | Yurochko et al. |
| 2006/0260921 A1 | 11/2006 | Lee et al. |
| 2006/0261984 A1 | 11/2006 | Jung et al. |
| 2006/0262095 A1 | 11/2006 | Ladouceur et al. |
| 2007/0034494 A1 | 2/2007 | Yurochko |
| 2007/0035522 A1 | 2/2007 | Yurochko et al. |
| 2007/0035962 A1 | 2/2007 | Yurochko |
| 2007/0200828 A1 | 8/2007 | Skillman |
| 2007/0256915 A1 | 11/2007 | Levy |
| 2008/0013300 A1 | 1/2008 | Yurochko |
| 2008/0064451 A1 | 3/2008 | Lee et al. |
| 2008/0088490 A1 | 4/2008 | Yurochko |
| 2009/0027235 A1 | 1/2009 | Kim et al. |
| 2009/0173614 A1 | 7/2009 | Babella |
| 2009/0179861 A1 | 7/2009 | Skillman et al. |
| 2009/0295605 A1 | 12/2009 | Skillman |

FOREIGN PATENT DOCUMENTS

| | | |
|---|---|---|
| DE | 10203400 | 6/2003 |
| EP | 0760291 A2 | 3/1997 |
| EP | 1143327 A1 | 10/2001 |
| EP | 1172989 | 1/2002 |
| EP | 1197835 | 1/2002 |
| EP | 1265261 | 12/2002 |
| EP | 1507189 A1 | 2/2005 |
| EP | 1523021 A1 | 4/2005 |
| EP | 1569070 A1 | 8/2005 |
| EP | 1569077 A1 | 8/2005 |
| EP | 1575069 A1 | 9/2005 |
| EP | 1585153 A1 | 10/2005 |
| EP | 1619705 A1 | 1/2006 |
| EP | 1619860 A1 | 1/2006 |
| EP | 1696448 | 8/2006 |
| JP | 2001126588 | 5/2001 |
| WO | WO81/02272 | 8/1981 |
| WO | WO96/27256 | 9/1996 |
| WO | WO98/01876 | 1/1998 |
| WO | WO99/37025 A | 7/1999 |
| WO | WO00/30381 A | 5/2000 |
| WO | WO03/007582 | 1/2003 |
| WO | WO2004/001578 | 12/2003 |
| WO | WO2004/059955 | 7/2004 |

* cited by examiner

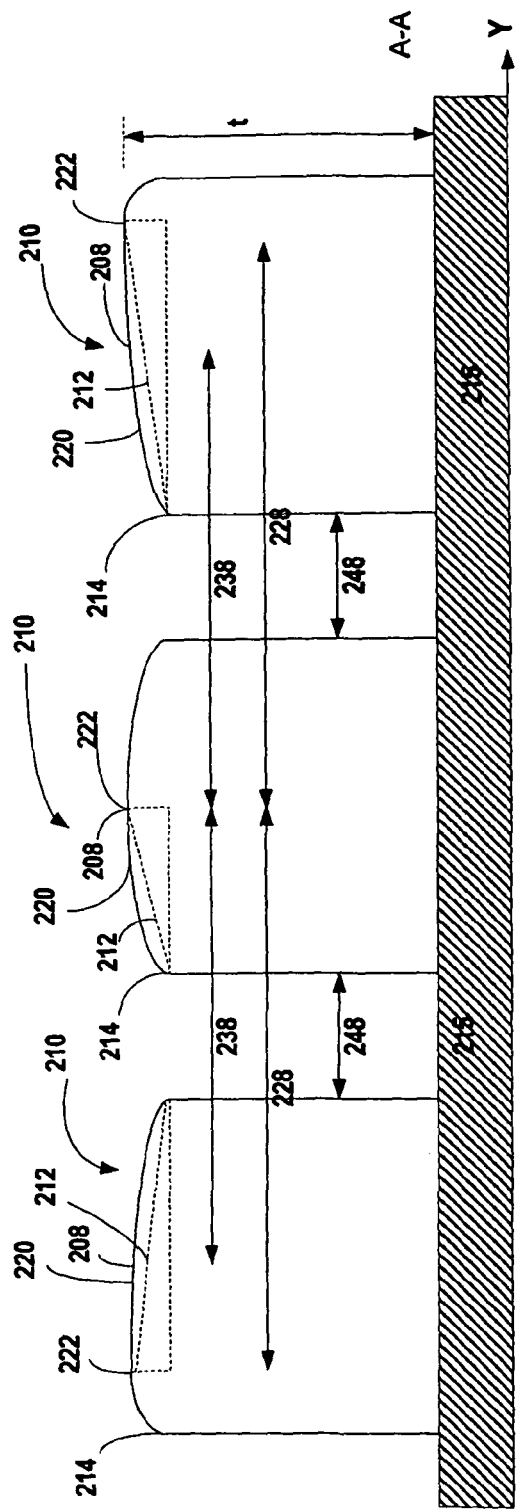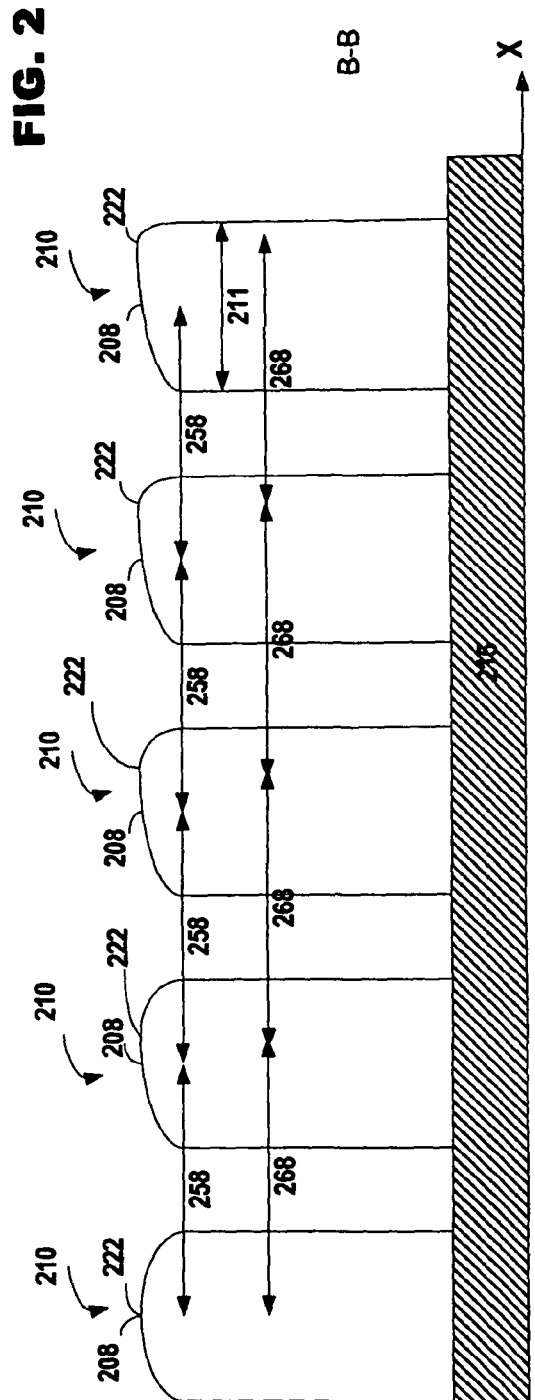

SMALL FORM-FACTOR KEYBOARD USING KEYS WITH OFFSET PEAKS AND PITCH VARIATIONS

RELATED APPLICATIONS

This application is a continuation of U.S. patent application Ser. No. 11/144,098, filed Jun. 2, 2005 now U.S. Pat. No. 7,394,030 entitled SMALL FORM-FACTOR KEYBOARD USING KEYS WITH OFFSET PEAKS AND PITCH VARIATIONS; the aforementioned priority application being hereby incorporated by reference in its entirety.

TECHNICAL FIELD

The disclosed embodiments relate generally to the field of keyboards for mobile computing devices. In particular, the disclosed embodiments relate to a small form factor keyboard having offset pitch and peak variations.

BACKGROUND

Over the last several years, the growth of cell phones and messaging devices has increased the need for keypads that are small and tightly spaced. In particular, QWERTY keypads have become smaller with greater key switch density. With decreasing overall size, there has been greater focus on efforts to make individual keys more usable to a user. For example, keyboard design considers how readily the user can select or click ("clickability") individual key structures of keyboard. The clickability may be affected by various factors, such as the individual key structure size and shape, as well as the spacing between key structures and the tactile response of individual key structures.

With the growth of small form factor devices, such as cell phones and wireless messages, there have been several designs and schemes for providing smaller functional keypads, particularly with respect to keypads that provide character entry. For example, keyboard layouts have been designed using button structures and individual key orientations that reduce the overall surface area of the keypad. Such designs have often focused on QWERTY keyboard layouts, which normally require at least 26-30 individual keys.

BRIEF DESCRIPTION OF THE DRAWINGS

FIG. 2 is an illustrative cross-sectional view along lines A-A of FIG. 1, illustrating the shape of each key in a given column along a given axis.

FIG. 3 is an illustrative cross-sectional view along lines B-B of FIG. 1, illustrating the shape of each key in a given portion of a row along another axis.

DETAILED DESCRIPTION

Figure 1:
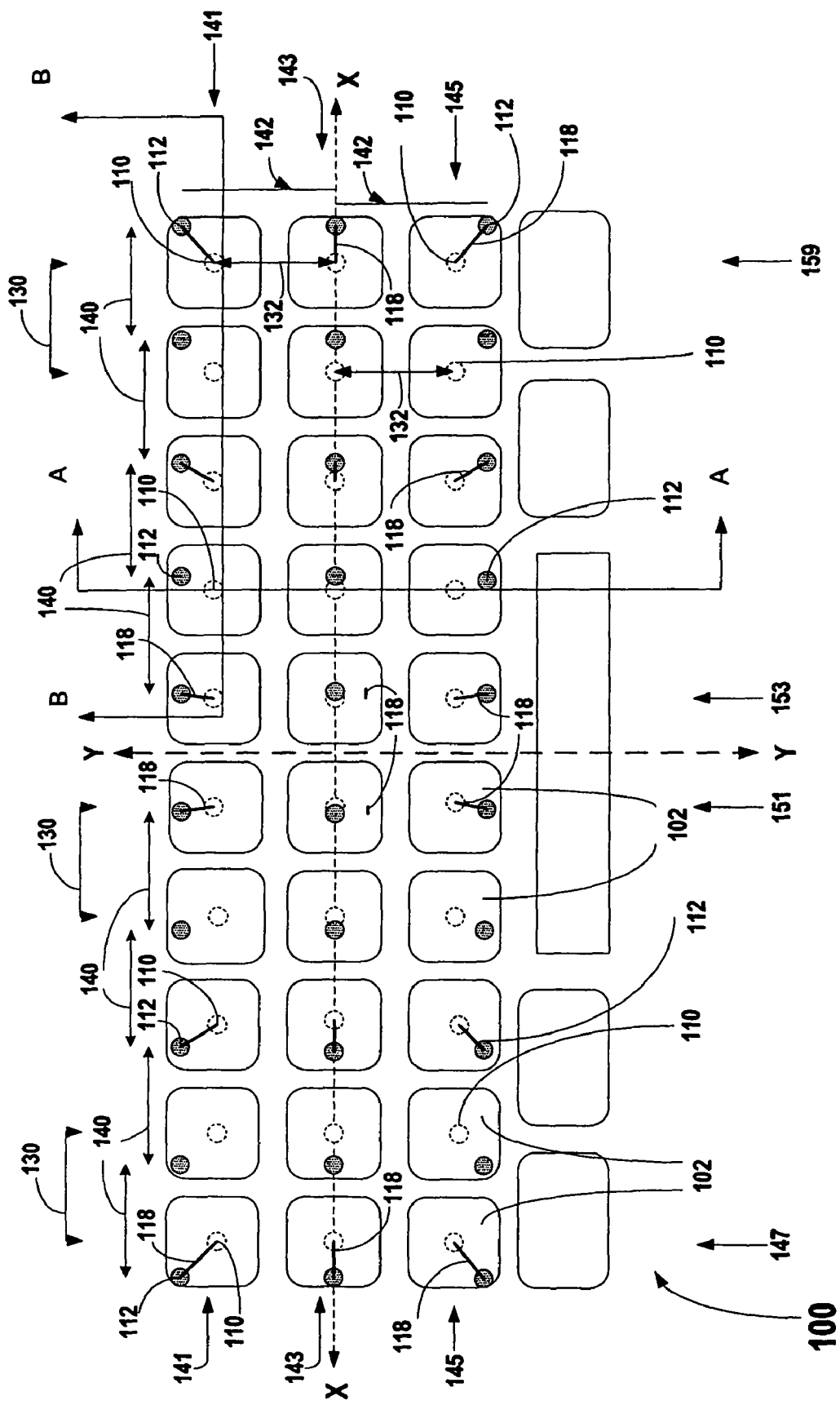
FIG. 1 illustrates key set design, under an embodiment of the invention.

Embodiments of the invention provide a small form-factor keypad or keyboard that utilizes its exterior contour and shape to enhance usability. According to an embodiment, a keyboard is provided having individual key structures that have offset peaks and/or pitch variations. The offset peaks and/or pitch variations provide tactile separation of individual keys, so that the keys feel further apart to the user as compared to keys that are uniformly shaped. In a small form factor keyboard, the user can better distinguish individual buttons or keys because the keys or buttons are more distinguishable to touch. Additionally, the space needed to provide a full set of keys (e.g. as required in a QWERTY layout) may be reduced, without sacrificing the user's ability to effectively identify and select individual key structures using thumbs or finger tips.

While there have been past attempts to facilitate touch or thumb typing on small form keypads, many of the past approaches have focused on key orientation (e.g. angled keys) and key spacing. In contrast to past approaches, embodiments of the invention provide for key structures that are contoured to have peaks or other outward formations. Within individual keys, the peaks may be spaced from the center point. According to embodiments described herein, the spacing between the peak and center points is varied from key to key, so as to provide the user with tactile separation. In order to achieve the tactile separation, the relative position of the peak with respect to the key's center point is based on the position of that key in the key set or keyboard. In one embodiment, the peak-to-peak separation between adjacent keys of a keyboard is uniform and greater than a center-to-center separation between the same keys.

Overview

According to one embodiment, individual keys in a key set or structured so that the surface of each key includes a pitch or other surface variation that forms a raised-strike point (alternatively referred to as a peak) for that key. The raised strike point may be made offset from the center point or centerline of some of the individual keys. In any particular key, the existence and degree of offset between the strike point and the center point may be based on the relative position of that key in the key set or keyboard. In one embodiment, a relative position of the raised strike point of individual keys may be gradually shifted in one direction and/or another from key to key, so that so that the spacing between an interior center reference of adjacent or neighboring keys (such as center point to center point) may be made less than the spacing between the raised strike points of the same respective keys. The larger spacing between shifted strike points of adjacent keys provide tactile separation for the user.

Embodiments of the invention may be implemented in the context of a keyboard or keyboard device. One embodiment includes a QWERTY layout for keys of a keyboard, with individual keys in the keyboard being provided an exposed surface on which a strike point and pitch are provided. The pitch and strike point position may vary slightly from key to key, with variations being most pronounced on edge keys (those keys that are furthest from a centerline of the keyboard). This provides greater spacing between strike-points for all keys of the keyboard.

An embodiment includes a keyboard having a plurality of key structures. The key structures that form the keyboard may be distributed in a direction of at least a first axis. Each key structure in the plurality of key structures may include an exterior surface for receiving user-contact. The exterior surface of each key structure may include a center reference and a peak, so that an offset distance between the center reference and the peak is greater than or equal to zero. The offset distance for at least two or more key structures in the plurality of key structures is different. The difference in the offset distance may be based on a position of the individual key structures relative to a first reference line.

In an embodiment, a magnitude of the offset distance in the direction of the first axis ranges from (i) a minimum for one or more key structure that are closest to the first reference line, to (ii) a maximum for one or more key structures that are furthest to the first reference line. Additionally, a peak-to-peak distance between the peaks of key structures that are adjacent in the direction of the first axis is about equal for key structures in at least a majority of the plurality of key structures.

Throughout this application, numerous references are made to measurements, such as distances and positions. The use of language, such as "substantially", "about" or "approximately", in the context of defining or quantifying such measurements are provided to give some margin of variation as deemed practical given the context of the usage. For example, two quantities may be deemed about equal to each other if they are within 5% of one another.

In one embodiment, the center reference of a key structure may include a line, point, region or other area on an exterior surface (the surface that is to be in contact with the finger tip or other key striking element) that is central to the boundary of that key structure. In the case where the keyboard include asymmetrical shaped keys, or keys of varying shapes, the center reference may correspond to any convenient interior reference for providing a consistent measurement of the separation between keys, so as to provide a comparison for the separation provided by shifting and/or offset peaks.

The peak of a key structure includes a line, point, region or other area on an exterior surface having the greatest height, as measured from the underlying surface used for the key structure.

Keyboard Layout

FIG. 1 illustrates key set design, under an embodiment of the invention. In particular, a key set 100 is arranged to provide individual keys 102 corresponding to alphanumeric characters. Other input functions may also be provided through use of the individual keys. According to one embodiment, each key 102 in the key set is a structure, such as a pressable button or a deformable member. In a typical scenario, the pressing of each such structure may cause actuation of an electrical signal that is then identified by internal resources of a host electronic device as a character entry, or some other form of input.

The key set 100 may be provided on any one of a plurality of devices or mediums. In one embodiment, the key set 100 is provided on an electronic device having a form factor that enables the device to be readily carried with one hand, or placed in a pocket. Examples of devices with such form factors include personal digital assistances (PDAs) such as PALM TUNGSTEN models manufactured by PALMONE, INC., the BLACKBERRY models manufactured by RESEARCH IN MOTION, and the IPAQ models manufactured by HEWLETT-PACKARD INC. Other examples of such small form factor devices include cellular phones and devices capable of messaging across wireless or cellular data lines, including for example, the HANDSPRING TREO models. An embodiment of the invention may be implemented on attachment or accessory device for a PDA or cellular phone. For example, a keyboard layout such as described with FIG. 1 may be implemented on an attachable and detachable keyboard device for PDAs and cellular phones. Such attachment devices may be equipped with connectors or other connectivity means to transfer data corresponding to key selections to a processor of the electronic device. In still another implementation, an arrangement such as shown and described with FIG. 1 may be provided with a larger form-factor device, such as a laptop computer.

As will be described, an embodiment such as illustrated by FIG. 1 may be implemented to promote the use of thumb-typing. In particular, thumb-typing is made easier in that the user can more readily distinguish keys through sensation of his or her thumbs. Thumb-typing generally refers to the practice of typing with the primary use of one or two thumbs, usually on a small form-factor keyboard. For example, one typical thumb-typing technique is to hold an electronic device with two hands, then move one or both thumbs to select individual keys on the keyboard, as needed. In many cases, the user's thumb covers several keys at one time. In these cases, uniform shaped keys are hard to distinguish through touch. Furthermore, in order to select a desired key (once it is distinguished), the user may angle his thumb to reduce the surface area on the keys so as to more precisely make the desired selection. When repeated over time, thumb-typing in such cases can be tedious to the user. The design of spaced strike points, as described by embodiments of the invention, enable thumb-typing users to more readily distinguish one key over another key using touch (such as from the surface of a thumb). Furthermore, because the spaced-apart strike points make the individual keys more distinguishable, the user can select or press a desired key more easily, so as to require less focus on angling or directing his thumb surface to the selected key.

In FIG. 1, the keys 102 of the key set 100 are distributed about horizontal and vertical reference lines (X and Y). The particular arrangement presented is for a QWERTY style keyboard, although embodiments of the invention are equally applicable to other types of keys set arrangements, such as, for example, DVORAK or number pad layouts. As such, the key set 100 includes three rows and ten columns.

Individual keys 102 of the key set may include a center point 110 and a strike point 112. The center point 110 and the strike point 112 of each key may correspond to a respective region or surface area on an exposed surface of the key 102. The strike point 112 of any particular key refers to a peak, meaning a raised area that is more likely to be struck when the user presses or otherwise makes contact with the key 102. The center point 110 is just one example of a reference point (particularly when symmetrically shaped keys are used), and other reference points (such as an edge point or on off-key location) or locations may be substituted in providing this description. However, the use of center points 110 provides a basis for comparison with previous keypad structures that aligned strike points with the center points. For simplicity, symmetrical and identical keys 102 are assumed, so that the center point 110 is similarly situated on each key. Furthermore, in FIG. 1, each key 102 is assumed to be spaced equally apart. The result is that a horizontal reference point distance 130 (in the direction X) between the center points 110 of adjacent keys 102 are the same. Likewise, a vertical reference point distance 132 (in the direction Y) between the center points 110 of adjacent keys 102 are also the same. In an embodiment shown, the equidistance relationships between center points of keys 102 in both the X and Y directions holds true across a pertinent span (e.g. the 26 keys assigned alphabetical characters) of the key set 100. The assumptions used in describing an embodiment of FIG. 1 may be changed or ignored with other embodiments and implementations, depending on particular design implementations as the case may be.

While the horizontal and vertical center point distances 130, 132 are assumed to be the same between any two pair of adjacent keys when the horizontal or vertical directions are considered, the position of the strike points 112 relative to the center point 110 of any particular key 102 varies amongst keys spanning in the X and Y directions respectively. In one embodiment, the position of the strike point 112 on each key 102 is inversely affected by the position of the corresponding key from a centerline or reference line of the key set 100 as a whole. In an example shown, centrally located keys in row 143 and columns 151, 153 have near or complete overlap between the strike points 112 and the center points 110. A distance 118 measured between the strike point 112 and the center point 110 is minimal, zero or almost zero. For the keys 102 in rows 141 and 145 (above and below row 143) and columns 151 and 153, the strike points 112 are off center along the axis Y. In row 141, the strike point 112 is above center point 110, so that distance 118 has a positive magnitude in the Y direction. In row 145, the strike point 112 is below the center point 110, so that the distance 118 has a negative magnitude in the Y direction. A vertical peak-to-peak distance 142 is thus constant between adjacent pairs of keys 102 in both of columns 151, 153. This vertical peak-to-peak distance 142 is greater than the vertical reference distance 132, as measured between center points 110 of the same pairs of keys 102.

Moving rightward from the axis Y, the position of the strike points 112 migrates off-center positively along the axis X. The keys 102 in edge column 159 have the greatest distance 118 between the center point 110 and the strike point 112. The key in row 143 of column 147 may be off-center in only the X direction, the key in row 141 of column 159 is off-center positively (above row 143) in the Y direction, and the key in row 145 of column 159 is off-center negatively (below row 143) in the Y direction. A horizontal peak-to-peak distance 140 between the strike points 112 of adjacent keys 102 along the axis X may be equidistant. Furthermore, an embodiment provides that the horizontal peak-to-peak distance 140 between the strike points 112 of the adjacent keys 102 may be greater than the horizontal reference distance 130 between the center points 110 of adjacent keys 102 in the X direction. Thus, for example, the magnitude of the distance 118 between the center point 110 and the reference point 112 of the corner keys in column 159 are a maximum, as they include a maximum component in each of the X and Y directions. The magnitude of the distance 118 between the center point 110 and the reference point 112 of the key 102 in the center row 143 of column 159 has a maximum component only in the X direction.

In an embodiment such as described in FIG. 1 provides for key set 100 to be symmetrical about the axis Y. This, the strike points 112 may migrate leftward as the key spans negatively along the axis X. The corner keys 102 of the left edge column 149 may include the strike points 112 that are positioned in far left top and bottom corners, so that the distance 118 of those respective keys is about the same as the right column 159 keys.

While an embodiment illustrated with FIG. 1 includes square shaped key surfaces, other embodiments may use other shapes, such as circular or elliptical. Individual keys may also be irregular or non-symmetrical in shape. In such cases, the distance measurement may correspond to a common (on-key or off) reference point and the strike point of the respective key. For example, the distance between the strike point and any on-key reference point may increase for keys that are further from the centerlines and/or nearer to the edges of the key set.

FIG. 2 is an illustrative cross-sectional view along lines A-A of FIG. 1, illustrating the shape of each key in a given column along the axis Y. As illustrated, each key 102 may correspond to a structure 210 that can be pressed, moved inward, or otherwise actuated with touch or contact. In one implementation, the structures 210 are interconnected by a medium 215. For example, medium 215 may be formed from flexible material, such as plastic or flexible injection-molded materials. The structures 210 and the medium 215 may be formed from a common material. In this respect, the key set 100 may be an integrated or unitary structure. Each structure 210 may extend a thickness t from the medium 215 to form an exposed surface 220 having a peak 222. The exposed surface 220 may form the contact surface for the user. The peak 222 may correspond to the strike point 112 of FIG. 1. The peak 222 may be formed by shaping the exposed surface 220 to rise and fall at a particular location.

Each structure 210 may form a pitch 212, illustrated by a reference line C (rise to peak and run to position of peak along axis Y). The pitch 212 in FIG. 2 is measured between an edge reference 214 and the peak 222, although other reference points may be used. The pitch 212 of each structure 210 may vary in the Y direction. If each peak 222 is of the same height, the variation in pitch 212 amongst different keys may be attributed to the migration of the peak 222 along the axis Y from key to key.

In the example provided by FIG. 2, the left-most structure 210 (which may correspond to any key 102 in the first row 141 of FIG. 1) may be provided with a peak 222 that is positioned leftward with respect to a center point 208. The resulting pitch 212 is oriented towards the left side of the center point 208. When the adjacent key structure 210 is considered, the peak 222 may migrate right-ward (which corresponds to downward direction in FIG. 1), so that in the middle structure 210 (corresponding to the key 102 in the center row 143 of FIG. 1), the peak 222 is aligned substantially with the center point 208. In the next key, the peak 222 is to the right of the center point 208, symmetrically disposed with the left key 102.

As shown by FIG. 2, the pitch 212 from key structure 210 to key structure may actually vary as a result of the position of the peak 222 changing. The position of the peak 222 may change about any reference line or point. For example, in FIG. 2, the peaks 222 are symmetrically disposed about a horizontal centerline.

As described in FIG. 1, a distance 228 may correspond to the distance between the peaks 222 of adjacent key structures 210. This distance may be larger than a vertical reference distance 238 between center points 208 of adjacent keys, or the distance 248 between edge points of adjacent keys. According to some past approaches, when symmetrical key shapes are used without offsetting peaks 212, the strike point of each individual key structure may be approximated as the center point of that structure. The distance between center points would then determine the user's ability to distinguish one key from another. In contrast to such approaches, the distance 228 of adjacent peaks 222 is larger than the vertical reference distance 238 that separates adjacent center points 208 in the Y-direction. This provides the user with the sensation that there is more room between the adjacent key structures, as the individual key structures are more distinguishable through touch.

FIG. 3 is an illustrative cross-sectional view along lines B-B of FIG. 1, illustrating the shape of each key in a given portion of a row along the axis X. In FIG. 3, half of first row 141 is illustrated, beginning with column 153 and extending to column 159. When viewed along the axis X, the individual key structures 210 are more narrow in dimension 211, meaning the footprint for each structure 210 is smaller and more curved than when the same structure 210 is viewed along the axis Y.

In the reference frame of FIG. 3, the peak 222 of the structure 210 in column 153 is centered, at least when compared to the other key structures 210 in the same row. The structure 210 in the next column 155 may have its peak 222 slightly shifted away from its center point 208. This migration may be repeated, so that in column 159, the peak 222 of the structure 220 is at its furthest position from the center point 208 along the axis X.

As with an embodiment described in FIG. 2, a horizontal peak-to-peak distance 268 may be greater than the distance between the center points 208 of each adjacent key structure 210. By providing the peaks 222 to be separated by the distance 268, rather than for example the horizontal reference distance 258 (measured between adjacent center points along axis X), adjacent keys can be more readily sensed and distinguished through touch when the key set 100 is in use.

When FIG. 2 and FIG. 3 are viewed together, the peaks 222 of individual key structures 210 can be understood as having a two-dimensional variance from key to adjacent key. This variance may be expressed as a vector formed by the combination of the vertical distance 228 and the horizontal distance 268. In one embodiment, for example, the further a particular key structure 210 is from a center line or reference point, the further towards the edge the peak 222. This means that for the vector defining the distance between the peak 222 and center point 208 of a given key structure, the magnitude of the vector increases the further that given key is from the centerline of the keyboard 100.

Figure 4:
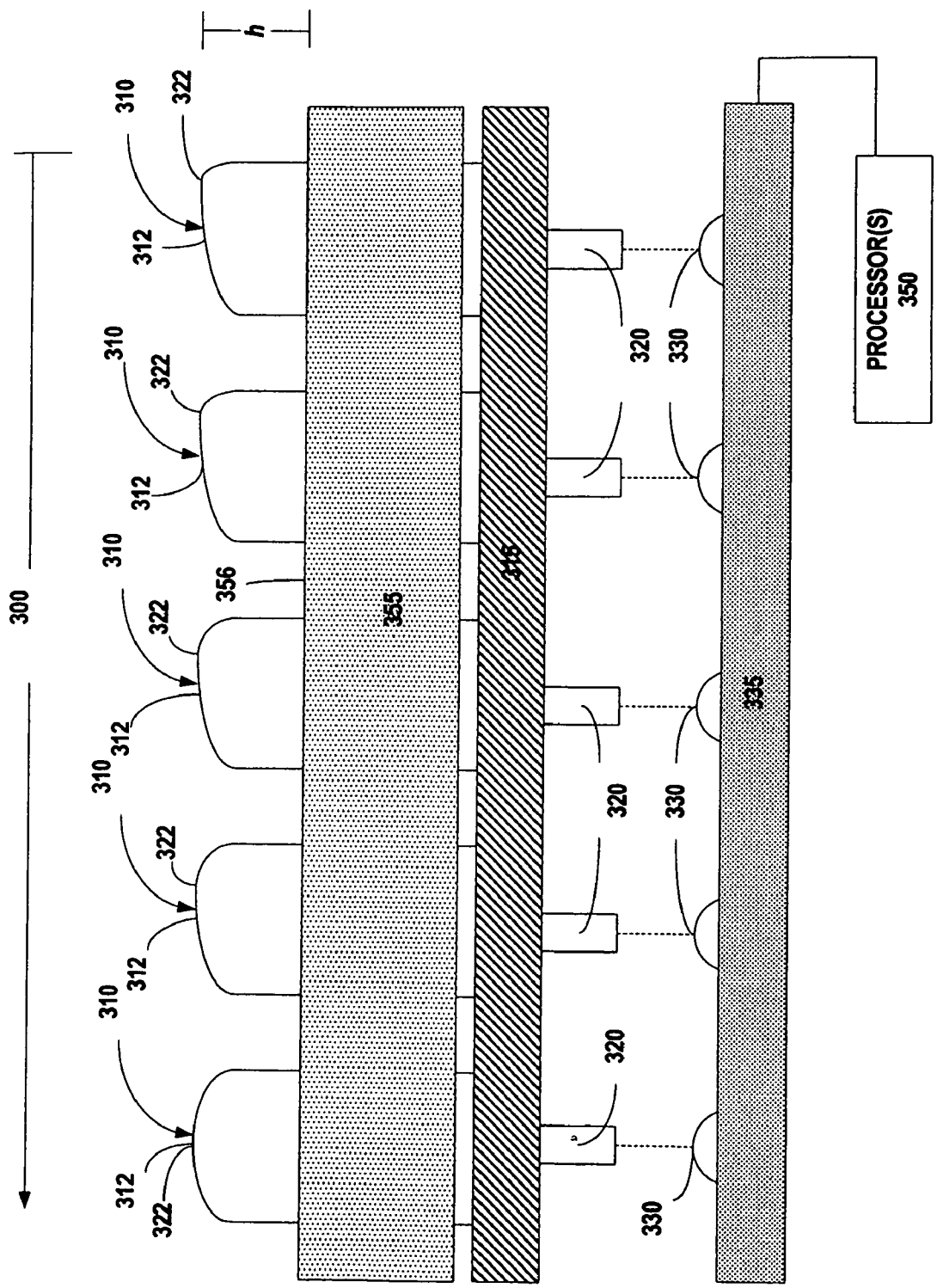
FIG. 4 illustrates a mobile computing device having a keyboard provided under an embodiment of the invention.
Figure 5:
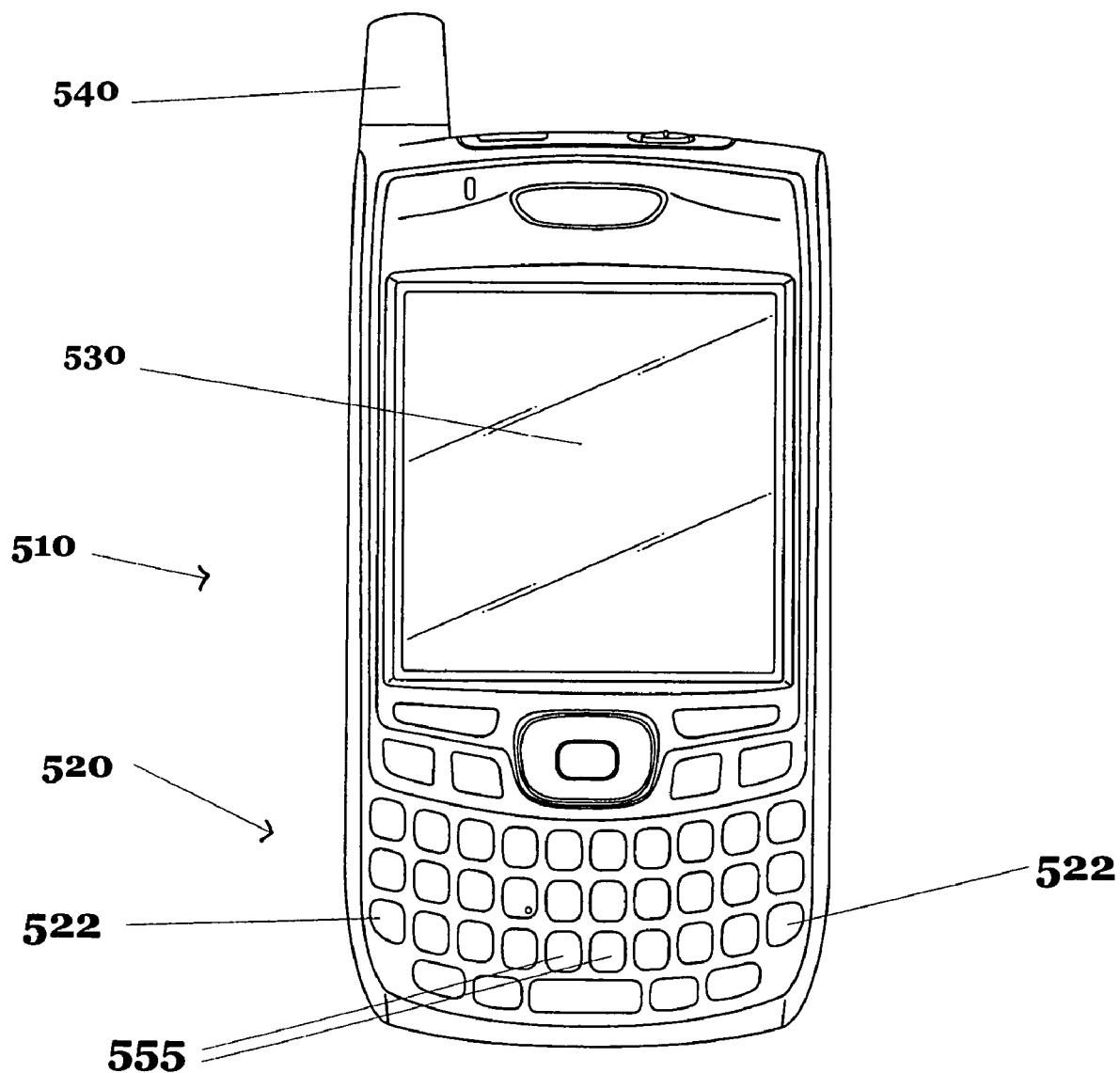
FIG. 5 illustrates a mobile computing device with a keyboard design implemented under an embodiment of the invention.

FIG. 4 is a simplified illustration of a keyboard implemented on a mobile computing device, in accordance with an embodiment of the invention. FIG. 4 illustrates a portion of a keyboard 300 corresponding to a cross-section provided by lines B-B for the key set of FIG. 1, with elements for operatively engaging the keyboard on a mobile computing device. For example, the keyboard 300 may be implemented on a mobile computing device similar to design and functionality such as shown in FIG. 5.

The keyboard 300 may include a plurality of key structures 310 (e.g. 30-34) interconnected by a carrier 515 underneath a housing layer 355. Individual key structures 310 extend a height h from an outer surface 356 the housing layer 355. An actuation member 320 may extend inward from a bottom of each key structure 310. In one implementation, each actuation member 320 may align with a corresponding electrical contact dome 330. The electrical contact domes 330 may be interconnected by a substrate 335 or flex cable. Electrical leads and/or circuitry may extend through the substrate 335 and interconnect to one or more processors 350.

In an implementation shown by FIG. 4, each actuation member 320 may be joined or integrally formed with each key structure 310. Alternatively, the actuation member 320 may be interconnected by glue or other means with the underside of the key structure 320. Still further, the actuation member 320 may connected to the contact domes 330. In either case, inward movement of the key structure 310 causes the corresponding actuation member 320 to actuate the aligned contact dome 330. The contact domes 330 may "snap" when pressed by the actuation members, corresponding to the individual contact dome collapsing onto an interior contact surface. This collapse causes a switch event, generating an electrical signal that is directed to the processor 350.

In an embodiment, the key structures are each provided with a peak 322 that is separated from the key structure center 312 by a distance that increases depending on how far the individual key structure is from a centerline of the keyboard. This separation and pitch variation provides tactile separation for the user when operating the keyboard 300. The collapsibility of the contact dome 330 provides additional tactile feedback.

Alternative Embodiments

While embodiments described with FIGS. 1-3 provide for key structures having symmetrical footprints, other embodiments may utilize key structures having asymmetrical shaped keys. For example, a keyboard for a mobile computing device may include keys that are asymmetric about the horizontal axis X and the vertical axis Y. Such key structures exist on, for example, the HANDSPRING TREO 600, manufactured by PALMONE, INC. The design of offset peaks and/or pitch variations may be employed with such keyboards in a manner similar to embodiments shown above. If key structures on the keyboard are uniformly shaped, then the spacing between adjacent keys at a common reference point (e.g. right edge of each key structure) will be less than the spacing of the peaks between the same adjacent key structures.

It may also be possible for key structures on a keyboard to have differently shaped keys. For example, key structures on the boundary of the keyboard may be provided with a contoured edge to provide the keyboard with a curved boundary. In such embodiments, the peaks of individual structures may be made offset with respect to a midpoint or common center point of some or all key structures, so that the peak-to-peak distance between adjacent key structures is maximized.

While an embodiment described with FIG. 4 and elsewhere make reference to key structures that are interconnected by carriers and/or molded as a thickness having the peaks shown, other embodiments may include other forms of key structures. For example, each key structure may correspond to a spring-loaded cap that is independently moveable on the surface of the housing. In such cases, the material used to form the caps (e.g. plastic) may be contoured to provide the desired spacing between the peak and the center of a given key structure.

Mobile Computing Device

FIG. 5 is a top view of a mobile computing device on which an embodiment of the invention may be implemented. The mobile computing device 510 may correspond to a combination cell phone, organizer and text-messaging device (e.g. email). For text entry, the mobile computing device 510 includes a small form-factor keyboard 510. The keyboard 510 includes a separate key 520 for each alphabet character. Additional special keys (e.g. application launch, SHIFT, ENTER, ALT) may be included, so that the total number of keys is greater than 30. The keys are provided in rows and columns, so that a QWERTY style keyboard may be implemented. Other elements of the device 510 include a display 530, and an antenna 540. The display presents content, including content generated by the user manipulating the keys 520 of the device 510. The antenna 540 may be part of a system that transmits and receives data over a cellular network. The data may correspond to voice, text, image or other forms of communications. The keys 520 may extend from a surface of a housing 550.

FIG. 5 shows the keys 520 uniformly spaced apart in an arced pattern (so that individual rows form a smiley face). The keys may be individually contoured in a manner described with embodiments such as presented above to include offsetting peaks and/or pitch variations from key to key. As FIG. 5 is a top view, the contours of the individual keys 520 are not shown. In an embodiment, the keys 520 are provided footprints that are varied in shape to better accommodate the offsetting peaks and pitch variation presented on the individual keys. In an embodiment such as shown, the footprint is substantially rectangular or square (with rounded corners) for keys that are centrally positioned in the keyboard. The further a key is positioned from a central column 555, the more skew the shape of the footprint. Perimeter footprints may be most skewed, with each key 520 that is off center from central column 555 having a trapezoidal footprint.

Certain perimeter or edge keys 522, such as those forming corners, may be provided a footprint that has an alternative shape. Thus, it is possible for individual keys 520 in a given row to be irregular as compared to other keys. Furthermore, the some or all keys in a given row may be asymmetrical. In the example provided by FIG. 5, keys 520 centrally positioned have symmetrical footprints about both horizontal and vertical axes. The keys 520 that are skewed through positioning towards the perimeter are symmetrical about just the vertical axis. Perimeter or edge keys 522 are asymmetrical. Even with variations in symmetry and footprint shape, peak variations and offsetting peaks may be implemented on the individual keys 520 that form the keyboard or keypad.

Alternative Embodiments

While an embodiment such as shown in FIG. 5 may include all keys in at least three rows of the QWERTY layout to include peaks that form offsets, alternative designs may be implemented. In one embodiment, only a small portion of keys 520 in one or more given rows or columns has a peak that is offset from center. In such an embodiment, it is possible for the distance between the peaks of adjacent keys 520 may still be uniform, with additional spacing being provided by the narrowing of the spacing between the boundaries of individual keys.

In still another variation, an embodiment provides that variations in peak position do not occur between each adjacent keys 520, but between some adjacent keys. The variation in the position of the peak between keys of a given row/column may occur between, for example, every other key in a given row. In such an example, two adjacent keys may have peaks that are offset from center, but still located in the same relative position on the individual key. In the same row/column, the next two adjacent keys may have peaks that are offset in position with respect to one another.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A keypad comprising:
a plurality of key structures comprising two or more adjacent pairs of key structures that extend from an underlying surface, wherein the two or more adjacent pairs of key structures are distributed primarily in a first direction;
wherein each key structure in the plurality of key structures includes an exterior surface for receiving user-contact, the exterior surface of each key structure having a center reference and a peak; and
wherein for each of the two or more adjacent pairs of key structures, (i) a peak-to-peak distance between the peak of each key structure in the pair is greater than a distance between the center reference of each key structures in the pair, (ii) a height that the peak of each key structure in the pair is extended from the underlying surface is approximately equal; and (iii) a height that the center reference of each key structure in the pair is extended from the underlying surface is approximately equal.

2. The keypad of claim 1, wherein the peak-to-peak distance between the peaks of each of the adjacent pairs of key structures is about the same.

3. The keypad of claim 2, wherein the distance between the center reference of each of the adjacent pairs of key structures is about the same.

4. The keypad of claim 1, wherein the underlying surface forms a medium that interconnects each of the plurality of key structures, and wherein each key structure in the plurality of key structures has a height that is based on a dimension that extends vertically outward from the medium.

5. The keypad of claim 1, wherein the plurality of key structures form a QWERTY style keyboard.

6. The keypad of claim 1, wherein a footprint of individual key structures in the plurality of key structures is asymmetrical.

7. The mobile computing device of claim 1, wherein the plurality of key structures form a QWERTY style keyboard.

8. The mobile computing device of claim 1, wherein a footprint of individual key structures in the plurality of key structures is asymmetrical.

9. A mobile computing device comprising:
a housing;
a keypad provided on a surface of the housing, wherein the keypad includes a plurality of key structures comprising two or more adjacent pairs of key structures that extend from an underlying surface, wherein the two or more adjacent pairs of key structures are distributed primarily in a first direction;
wherein each key structure in the plurality of key structures includes an exterior surface for receiving user-contact, the exterior surface of each key structure having a center reference and a peak;
wherein for each of the two or more adjacent pairs of key structures, (i) a peak-to-peak distance between the peak of each key structure in the pair is greater than a distance between the center reference of each key structures in the pair, (ii) a height that the peak of each key structure in the pair is extended from the underlying surface is approximately equal; and (iii) a height that the center reference of each key structure in the pair is extended from the underlying surface is approximately equal.

10. The mobile computing device of claim 9, wherein the peak-to-peak distance between the peaks of each of the adjacent pairs of key structures is about the same.

11. The mobile computing device of claim 10, wherein the distance between the center reference of each of the adjacent pairs of key structures is about the same.

12. The mobile computing device of claim 9, wherein the underlying surface forms a medium that interconnects each of the plurality of key structures, and wherein each key structure in the plurality of key structures has a height that is based on a dimension that extends vertically outward from the medium.

* * * * *